(12) United States Patent
Kang et al.

(10) Patent No.: US 9,300,854 B2
(45) Date of Patent: Mar. 29, 2016

(54) APPARATUS AND METHOD FOR DETECTING AND CONNECTING COUNTERPART DEVICE BY CAPTURING IMAGE OF COUNTERPART DEVICE IN WIRELESS DEVICE

(75) Inventors: Shin-Il Kang, Suwon-si (KR); Hun-Je Yeon, Seoul (KR); Jin-Wook Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 13/298,101

(22) Filed: Nov. 16, 2011

(65) Prior Publication Data

US 2012/0120266 A1 May 17, 2012

(30) Foreign Application Priority Data

Nov. 17, 2010 (KR) ........................ 10-2010-0114249

(51) Int. Cl.
| | |
|---|---|
| *G03B 13/00* | (2006.01) |
| *H04N 7/18* | (2006.01) |
| *H04N 5/225* | (2006.01) |
| *H04N 5/232* | (2006.01) |
| *H04N 21/414* | (2011.01) |
| *H04N 21/4223* | (2011.01) |

(52) U.S. Cl.
CPC ....... *H04N 5/23212* (2013.01); *H04N 5/23293* (2013.01); *H04N 21/41407* (2013.01); *H04N 21/4223* (2013.01)

(58) Field of Classification Search
USPC ......... 348/103, 106, 116, 181, 190, 195, 201, 348/203, 130, 135, 143, 169, 207.99, 220.1, 348/228.1, 346, 376; 382/130, 135, 143, 382/169, 207.99, 220.1, 228.1, 346, 376, 382/103, 106, 116, 181, 190, 195, 201, 203
See application file for complete search history.

(56) References Cited

U.S. PATENT DOCUMENTS

| | | | | |
|---|---|---|---|---|
| 5,647,019 | A * | 7/1997 | Iino et al. ....................... | 382/154 |
| 8,077,209 | B2 * | 12/2011 | Kamatani et al. ......... | 348/208.14 |
| 2005/0220450 | A1* | 10/2005 | Enomoto et al. .............. | 396/104 |
| 2008/0304707 | A1* | 12/2008 | Oi et al. ........................ | 382/103 |
| 2009/0074386 | A1* | 3/2009 | Hamada ........................ | 386/124 |
| 2009/0192813 | A1* | 7/2009 | Gejdos et al. ...................... | 705/1 |
| 2010/0311347 | A1* | 12/2010 | Le Thierry D'Ennequin et al. ............ | 455/67.11 |
| 2011/0138416 | A1* | 6/2011 | Kang et al. ...................... | 725/39 |

* cited by examiner

*Primary Examiner* — Aung S Moe
*Assistant Examiner* — Euel Cowan

(57) ABSTRACT

An apparatus and a method detect and connect a counterpart device by capturing an image of the counterpart device in a wireless device. A Relative Distance Value (RDV) between the wireless device and the counterpart device is determined via image capture using a camera. The counterpart device is identified using the determined RDV.

22 Claims, 9 Drawing Sheets

APPARATUS AND METHOD FOR DETECTING AND CONNECTING COUNTERPART DEVICE BY CAPTURING IMAGE OF COUNTERPART DEVICE IN WIRELESS DEVICE

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Nov. 17, 2010 and assigned Serial No. 10-2010-0114249, the entire disclosure of which is hereby incorporated by reference.

FIELD OF THE INVENTION

The present invention relates to a wireless device. More particularly, the present invention relates to an apparatus and a method for detecting and connecting a counterpart device by capturing an image of the counterpart device in a wireless device.

BACKGROUND OF THE INVENTION

Digital convergence denotes that various digital technology-based products and services are merged and born as a product or service of a new type. For example, digital convergence denotes a new technology and service field that displays data from a small screen to a large screen such that many people view the data together, or allows a user to use contents without terminating connection, even during movement, through cooperation between devices, or transmit data to a different device to share the data or allow the data to be freely used.

As a representative technology of digital convergence, an application service using a Digital Living Network Alliance/Universal Plug and Play (DLNA/UPnP) exists. However, to share contents or data between devices in a home network system of the DLNA, a series of procedures should be performed. This series of procedures is neither easy nor intuitive for a user to manipulate.

SUMMARY OF THE INVENTION

To address the above-discussed deficiencies of the prior art, it is a primary object to provide at least the advantages described below. Accordingly, an aspect of the present invention is to provide an apparatus and a method for detecting and connecting a counterpart device by capturing an image of the counterpart device in a wireless device.

Another aspect of the present invention is to provide an apparatus and a method for capturing an image of a counterpart device via a camera inside a wireless device in order for the wireless device to detect the counterpart device to be connected and intuitively connect the counterpart device when the wireless device desires to perform a predetermined function (for example, an image view function, a multimedia play function, a data backup function, a data share function, a synchronization function, a slide show function, and such) between the wireless device and the counterpart device in the same network environment.

Another aspect of the present invention is to provide an apparatus and a method for determining a shooting distance between an object and a wireless device performing an image capturing when the wireless device captures an image of a counterpart device, determining a Relative Distance Value (RDV) based on the determined shooting distance value, and using the determined RDV as a unique identification factor of a wireless device whose connection is desired.

Yet another aspect of the present invention is to provide an apparatus and a method for using auxiliary information (for example, bearings information, position information, radio signal intensity information, and such) together with an RDV as a unique identification factor of a counterpart device whose connection is desired in a wireless device.

In accordance with an aspect of the present invention, a method for operating a wireless device in a network environment where the wireless device and a counterpart device exist is provided. The method includes determining a Relative Distance Value (RDV) between the wireless device and the counterpart device via image capture using a camera. The counterpart device is identified using the determined RDV.

In accordance with another aspect of the present invention, an apparatus of a wireless device in a network environment where the wireless device and a counterpart device exist is provided. The apparatus includes a camera unit and a counterpart device registration and connection manager. The camera unit captures an image of the counterpart device. The counterpart device registration and connection manager determines a Relative Distance Value (RDV) between the wireless device and the counterpart device via the captured image, and identifies the counterpart device using the determined RDV.

Other aspects, advantages and salient features of the invention will become apparent to those skilled in the art from the following detailed description, which, taken in conjunction with the annexed drawings, discloses embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

Figure 1:
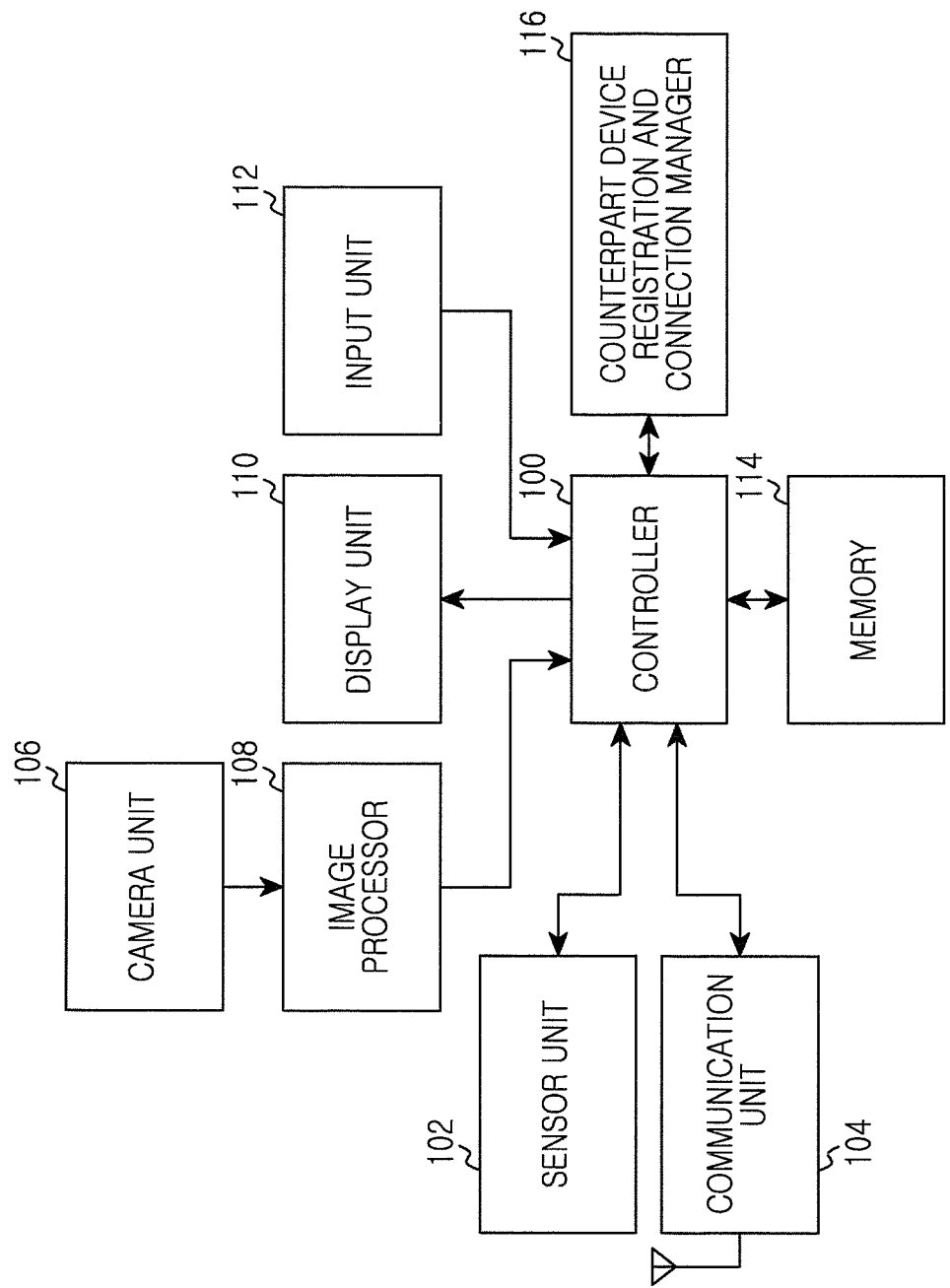
FIG. 1 is a block diagram of a wireless device according to an embodiment of the present invention.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless device. The following description with reference to the accompanying drawings is provided to assist in a comprehensive understanding of embodiments of the invention as defined by the claims and their equivalents. It includes various specific details to assist in that understanding but these are to be regarded merely as examples. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention are provided for illustration purpose only and not for the purpose of limiting the invention as defined by the appended claims and their equivalents.

Embodiments of the present invention provide an alternative for detecting and connecting a counterpart device by capturing an image of the counterpart device in a wireless device.

More particularly, embodiments of the present invention provide an alternative for capturing an image of a counterpart device through a camera inside a wireless device in order for the wireless device to detect the counterpart device whose connection is desired and intuitively connect the counterpart device when the wireless device desires to perform a predetermined function (for example, an image view function, a multimedia play function, a data backup function, a data share function, a synchronization function, a slide show function, and such) between the wireless device and the counterpart device in the same network environment.

Generally, when capturing an image, a user does not move for a predetermined time in order to form an image of an object on an image sensor inside a camera module of a wireless device. And after the image of the object is focused, the user performs a shooting (capturing) operation. The wireless device proposed by an embodiment of the present invention determines a factor of a 'capturing distance' between an object and the wireless device performing a capturing operation, determines a 'Relative Distance Value (RDV)' based on the determined 'capturing distance' value, and uses the determined RDV as a unique identification factor of a counterpart device whose connection is desired. In this situation, when heights (e.g. sizes) of relevant devices are not substantially the same, even though the plurality of devices exist in a small-scale network environment generally, the RDV determined after an image of an object is focused on an image sensor during image capturing has a different value depending devices. When a plurality of devices that have substantially the same height exist in the same network environment, RDVs of the relevant devices may have the same value. In this situation, the relevant devices may be identified using auxiliary information. For example, the auxiliary information may be bearings information, position information, Received Signal Strength Indicator (RSSI) information, and such, which may be obtained via an auxiliary unit (for example, a geomagnetic sensor, a Global Positioning System (GPS) module, a Radio Frequency (RF) module, and such) inside a wireless device.

In the following description, a wireless device denotes a mobile device on which a wireless Local Area Network (LAN) module, a camera module, a geomagnetic sensor, and a GPS module are mounted. In addition, a counterpart device denotes a network device whose movement is limited and which can be connected wirelessly. DLNA/UPnP technology is applied to the counterpart device.

In addition, embodiments of the present invention are for connection in an application layer between a wireless device and a counterpart device whose connection is desired, and assume that connection in a network layer is completed in advance.

FIG. 1 is a block diagram of a wireless device according to an embodiment of the present invention.

As illustrated in FIG. 1, the wireless device includes a controller 100, a sensor unit 102, a communication unit 104, a camera unit 106, an image processor 108, a display unit 110, an input unit 112, a memory 114, and a counterpart device registration and connection manager 116.

Referring to FIG. 1, the controller 100 controls an overall operation of the wireless device. More particularly, the controller 100 processes a function for detecting and connecting a counterpart device through image capturing.

The sensor unit 102 may be realized by combining at least one of a geomagnetic sensor, a GPS module, an RF module, and obtain auxiliary information (for example, bearings information, position information, and RSSI information) used as a unique identification factor of a counterpart device.

The communication unit 104 includes an RF transmitter for up-converting and amplifying the frequency of a transmission signal, and an RF receiver for low-noise amplifying a received signal and down-converting the frequency of the received signal.

The camera unit 106 includes an image sensor for converting a light signal detected upon image capturing into an electrical signal, and a signal processor for converting an analog image signal capturing by the image sensor into digital image data to obtain an image of a counterpart device. Here, the image sensor may be a Charge Coupled Device (CCD) or a Complementary Metal Oxide Semiconductor (CMOS) sensor. The signal processor may be a Digital Signal Processor (DSP).

The image processor 108 generates screen data for displaying camera image data provided from the camera unit 106. The image processor 108 has an image codec (not shown). The image codec (not shown) codes image data according to a predetermined scheme, or decodes encoded image data into original image data.

The display unit 110 displays state information generated during an operation of the wireless device, characters, moving images, still images, and such. The display unit 110 may be a color Liquid Crystal Display (LCD).

The input unit 112 includes a plurality of numerical keys and a plurality of function keys such as a menu button, a cancel (delete) button, an OK button, a TALK button, an END button, a shooting button, an Internet access button, and such, and provides key input data corresponding to a key pressed by a user to the controller 100. More particularly, the input unit 112 receives a device type and a name of a counterpart device from the user.

The memory 114 stores microcodes of programs for processes and controls of the controller 100, and various reference data. More particularly, the memory 114 stores a program for detecting and connecting a counterpart device through image capturing. In addition, the memory 114 maps and stores a captured image of a counterpart device obtained by the camera unit 106, a device type and a name input via the input unit 112, a Relative Distance Value (RDV) determined via the counterpart device registration and connection manager 116, and auxiliary information (for example, bearings information, position information, and RSSI information) obtained via the sensor unit 102.

The counterpart device registration and connection manager 116 processes a predetermined function (for example, an image view function, a multimedia play function, a data backup function, a data share function, a synchronization function, and a slide show function, and such) between a wireless device and a counterpart device by capturing an image of the counterpart device via the camera unit 106 to detect the counterpart device whose connected is desired, and intuitively connecting the counterpart device. In addition, when capturing an image of a counterpart device (object), the counterpart device registration and connection manager 116 processes a function for determining a shooting distance between the object and the wireless device that performs the shooting operation, and determining an RDV based on the determined shooting distance to use it as a unique identification factor of the counterpart device whose connection is desired while an image of the object is focused and resulted on a focus zone. In this situation, when heights of relevant devices are not the same, even though the relevant devices exist in a small-scale network environment generally, the RDV determined after an image of an object is focused on an image sensor during image capturing may be different depending on devices. When a plurality of devices that have the same height exist in the same network environment, RDVs of the relevant devices may have the same value. In this situation, the relevant devices may be identified using auxiliary information (for example, bearings information, position information, and RSSI information).

Meanwhile, while an image of a counterpart device is captured in an embodiment of the present invention, the height of the counterpart device (the vertical axis length of an object) should be focused suitable for the height of a focusing region called a focus zone inside the wireless device. Here, the height of the focus zone corresponds to the vertical axis length of an image sensor depending on an actual shooting direction of the wireless device. For this purpose, when capturing an image of the counterpart device, the wireless device may guide a user through an alarm such that an image of the object may be located within a setting range of the focus zone.

According to an embodiment of the present invention, a method for determining an RDV between an object and the wireless device that performs a shooting operation includes determining a shooting distance between an object and the wireless device that performs the shooting operation, and determining an RDV based on the shooting distance D obtained through this operation.

A correlation of factors related to the shooting distance is described below. An image of an object is formed on an image sensor (or a film when a film camera is used) by a camera lens. During this process, four factors, that is, the size of the object, the size (which is substantially the same as the size of the image sensor) of the image formed on the image sensor (that is, object image), a focal length of the camera lens (that is, a distance between the camera lens and the image sensor), and a shooting distance (that is, a distance between the camera and the object) influence one another. That is, when the size of the object increases, the size of the object image also increases. When the size of the object decreases, the size of the object image also reduces. In addition, when the focal length of the camera lens increases, the size of the object image also increases. When the focal length of the camera lens reduces, the size of the object image also reduces. Also, when the shooting distance is short, the size of the object image increases. When the shooting distance is long, the size of the object image decreases. Here, the 'size' referred with respect to the object, the object image, and the image sensor denotes the length, e.g., the height.

Therefore, a relation that a ratio of the height of the object over the height of the image sensor is equal to a ratio of the shooting distance over the focal length may be used. Accordingly, the shooting distance D may be determined using Equation 1 below.

$$\text{Shooting distance } D = \frac{\text{Height}(H) \text{ of object}}{\text{Height}(h) \text{ of image sensor}} \times \text{Focal length }(d) \qquad [\text{Eqn. 1}]$$

Here, the height (h) of the image sensor is a value of factory setting that may be standardized for each model of the wireless device. The focal length d is a distance between the image sensor and the camera lens, and is a value calculated inside while the object image is focused on the focus zone (while auto focusing or zoom in/out is performed). The height H of the object may be known by receiving a device type of a relevant device from a user when initially registering the counterpart device whose connection is desired. For example, the wireless device may receive a model name of the counterpart device whose connection is desired and access a web server to obtain basic dimension information regarding the relevant device, or manage basic information regarding wirelessly connectable devices and store the same in the wireless device in a database or table.

Figure 2:
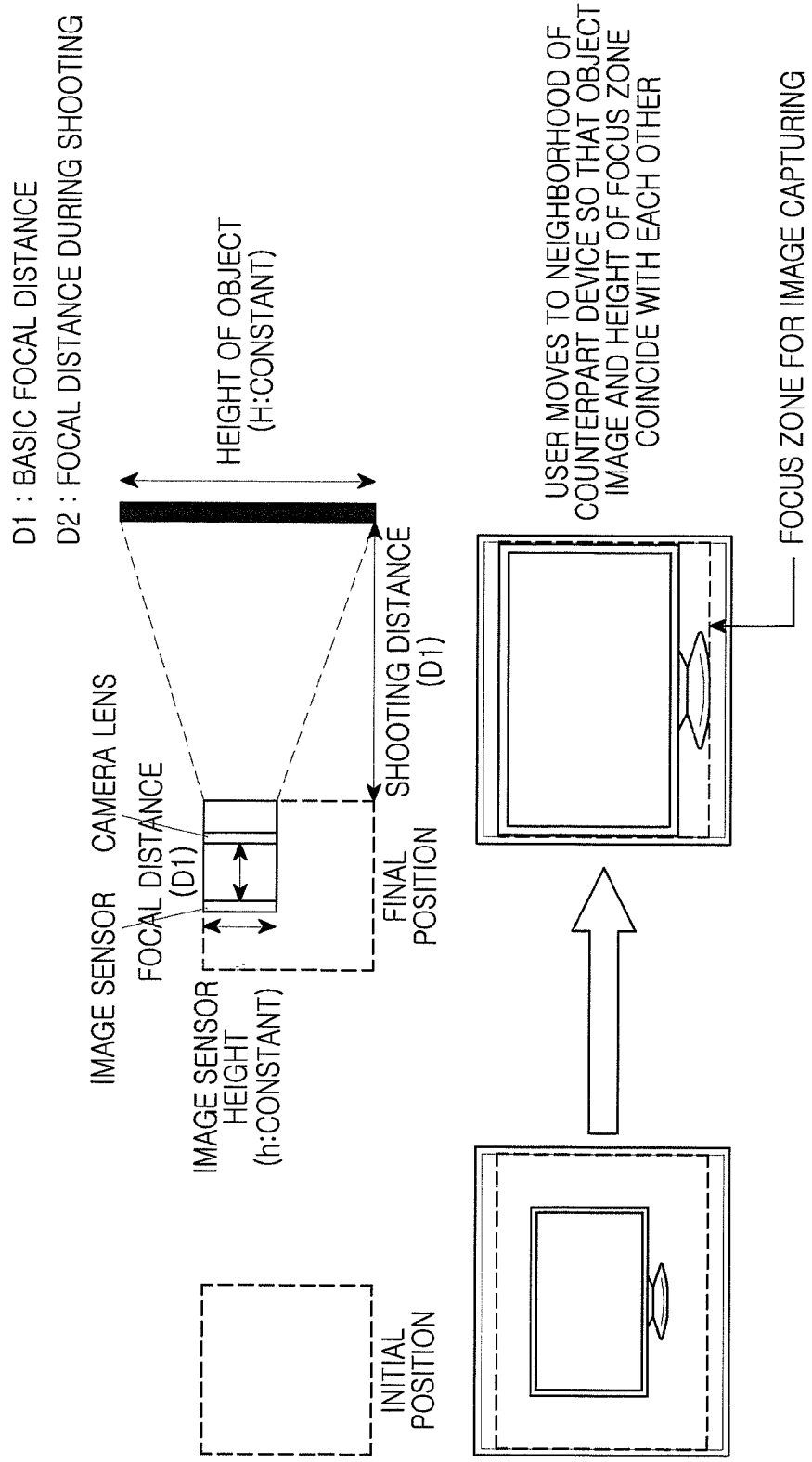
FIG. 2 is a view of a sample process for determining a shooting distance up to a counterpart device within the same network in a wireless device according to an embodiment of the present invention.

FIG. 2 is a view of a sample process for determining a shooting distance up to a counterpart device within the same network in a wireless device according to an embodiment of the present invention.

Referring to FIG. 2, when capturing an image of the counterpart device, the wireless device may guide a user to the general location of the counterpart device such that the height of the counterpart device (object) in focus is suitable for the height of the focus zone (height of the image sensor) inside the wireless device (i.e., the image of the object and the height of the focus zone coincide with each other) by informing that the object image and the height of the focus zone do not coincide and requesting the user to match the height of the focus zone using voice output via a speaker or using message output via a display unit. In this situation, the position of the user changes, but the focal distance maintains a reference focal distance. Therefore, a shooting distance determined by Equation 1 may be used as an RDV which is a unique identification factor of a counterpart device whose connection is desired.

Figure 3:
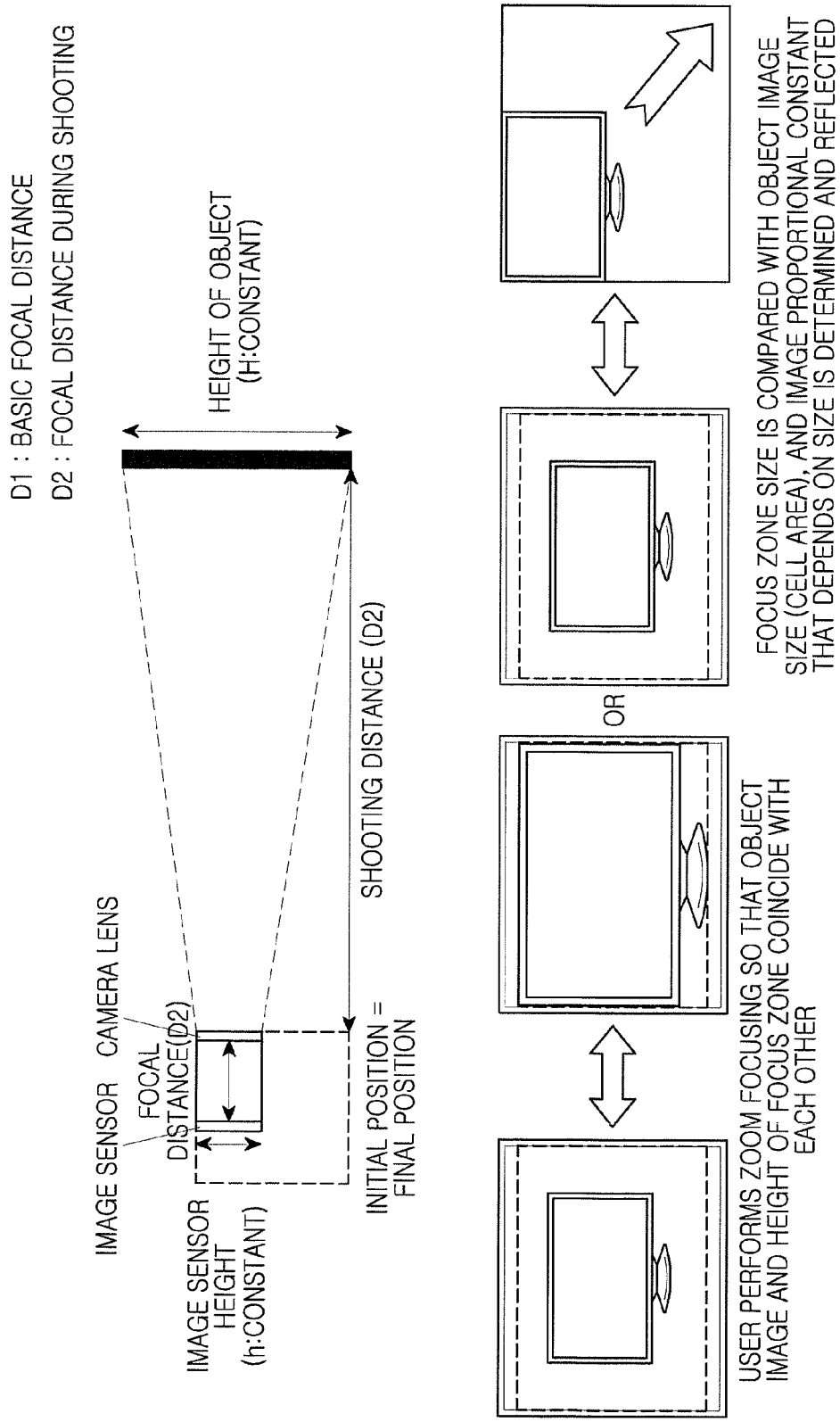
FIG. 3 is a view of a sample process for determining a shooting distance up to a counterpart device within the same network in a wireless device according to an embodiment of the present invention.

FIG. 3 is a view of a sample process for determining a shooting distance up to a counterpart device within the same network in a wireless device according to an embodiment of the present invention.

Referring to FIG. 3, a user may allow an image of an object and the height of a focus zone to coincide with each other by using an auto-focus function and a zoom function even when the user's position does not change. In this situation, a focal distance changes, and thus a proportional constant is determined by comparing a focal distance upon shooting at a basic focal distance, and the proportional constant may be reflected in determining an RDV according to Equations 2-4.

Alternatively, even when an image of the object and the height of the focus zone are not allowed to coincide with each other, a proportional constant depending on sizes is determined by comparing the image of the object with the size (area) of the focus zone, and the proportional constant may be reflected in determining an RDV according to Equation 2.

Therefore, the RDV according to an embodiment of the present invention may be determined using Equation 2, and a relevant device existing in a network environment may be identified using the determined RDV.

$$RDV = \frac{\text{shooting distance } D}{\text{image proportional } const. \ \varepsilon \times \text{focal length proportional } cont. \ \eta} \quad \text{[Eqn. 2]}$$

$$\text{image proportional } const. \ \varepsilon = \frac{\text{object image size } I_{zone}}{\text{focus zone size } F_{zone}} \quad \text{[Eqn. 3]}$$

$$\text{focal length proportional } const. \ \eta = \frac{\text{shooting focal distance } d_s}{\text{basic focal distance } d_b} \quad \text{[Eqn. 4]}$$

Here, in Equation 3, the object image size is the size of the object image, and the focus zone size is a reference value of the vertical size of the object image. The focus zone size is related with an image sensor size. The focus zone size may be equal to or less than the vertical length of the image sensor. In the present invention, the focus zone size may be defined by the height of the image sensor.

Also, the basic focal distance is a focal distance when there is no zoom-in or zoom-out. The shooting focal distance is a focal distance used for actual shooting.

When a plurality of devices that have the same height exist in the same network environment, the relevant devices may have the same RDV. In this situation, the relevant devices cannot be identified using only the RDV. In an embodiment, a process of adding and registering auxiliary information that can identify the relevant devices when initially registering a counterpart device whose connection is desired is proposed.

For example, the auxiliary information may be bearings information, position information, RSSI information, and such, which may be obtained via an auxiliary device (for example, a geomagnetic sensor, a GPS module, an RF module, and such) inside the wireless device. The wireless device may obtain absolute position information of a relevant device via the GPS module, and may measure a magnetic field value, that is, bearings information detected at a specific position using a geomagnetic distortion phenomenon via the geomagnetic sensor. Here, the position information may be obtained using cell-ID (Identification) information and RSSI information received from a base station, or may be known using RSSI received from an Access Point (AP) existing in the same network.

Figure 4A:
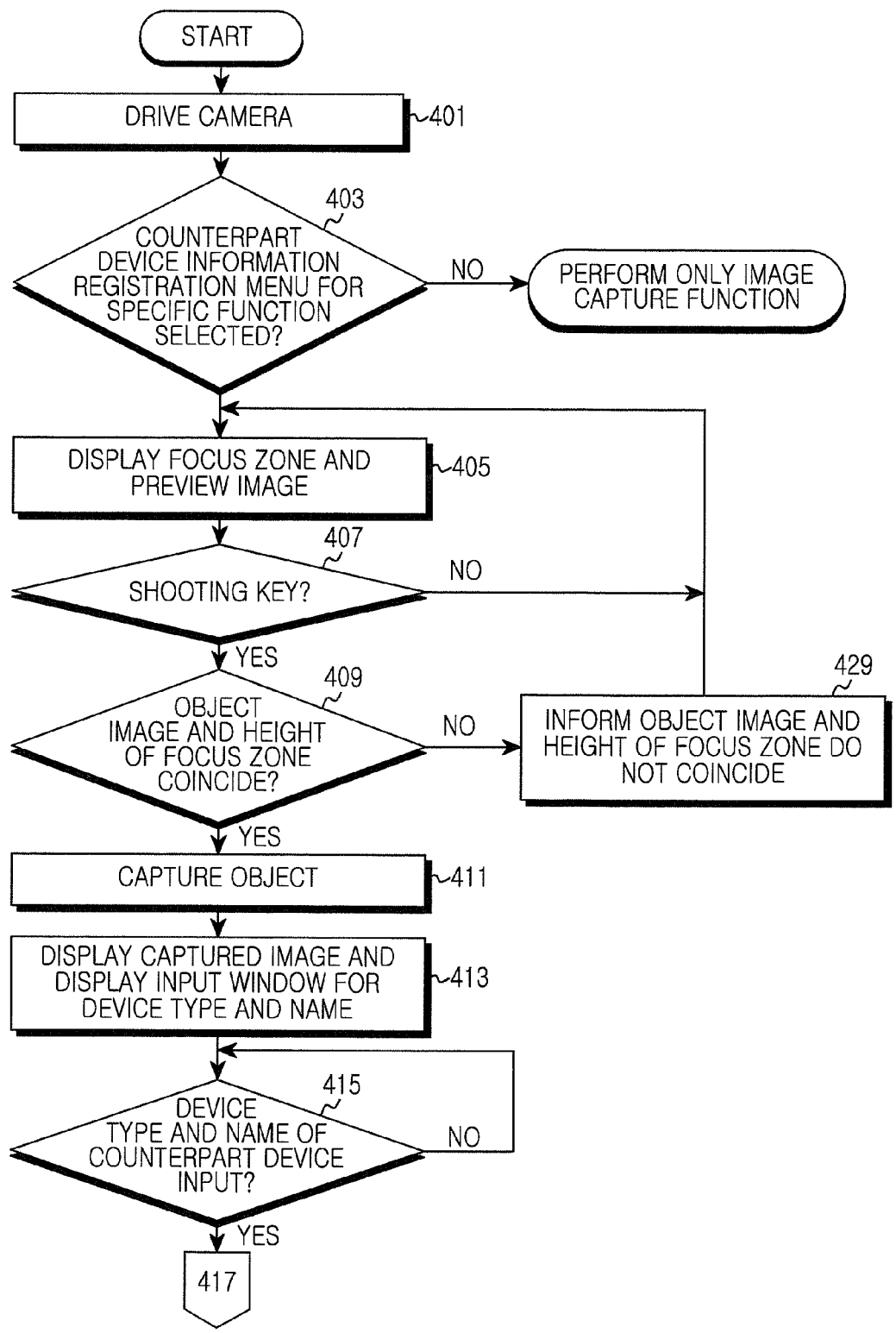
FIGS. 4A and 4B illustrate a process for registering a counterpart device whose connection is desired in order to perform a specific function in the same network in a wireless device according to an embodiment of the present invention.
Figure 4B:
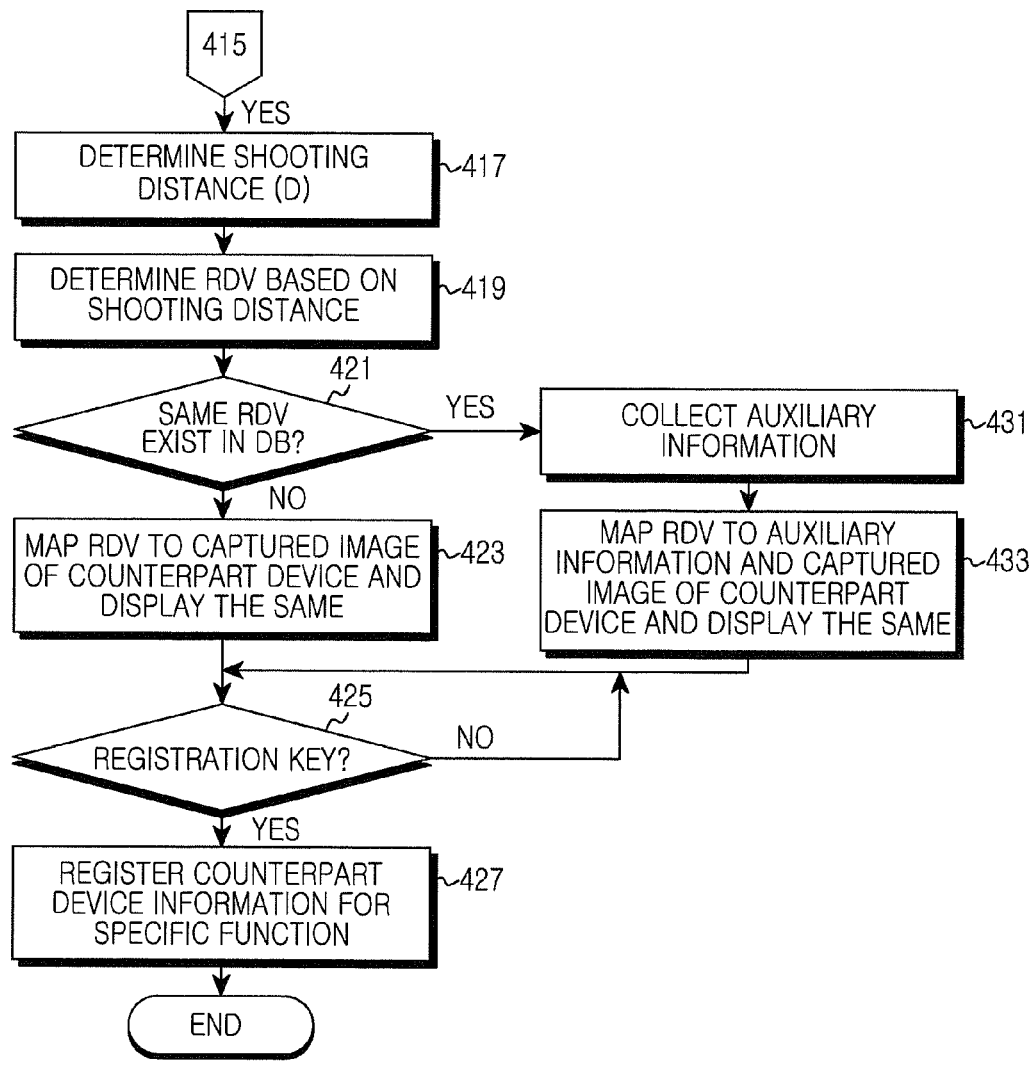

FIGS. 4A and 4B illustrate a process for registering a counterpart device whose connection is desired in order to perform a specific function in the same network in a wireless device according to an embodiment of the present invention. For the wireless device to capture a counterpart device whose connection is desired, intuitively connect to the relevant counterpart device, and perform a designated function between the wireless device and the counterpart device, a process for collecting and registering information that can be used as a unique identification factor of the counterpart device is performed. FIGS. 4A and 4B are flowcharts illustrating a process thereof.

Referring to FIGS. 4A and 4B, the wireless device drives a camera in step 401.

The wireless device determines whether a counterpart device information registration menu for a specific function is selected according to a user's key manipulation in step 403. For example, the function may be one of an image view function, a multimedia play function, a data backup function, a data share function, a synchronization function, and a slide show function. Various functions may be provided beside these.

When the counterpart device information registration menu for the specific function is not selected in step 403, the wireless device performs a general image capturing function.

In contrast, when the counterpart device information registration menu for the specific function is selected in step 403, the wireless device displays a focus zone and a preview image corresponding to camera capturing on a display unit in step 405.

The wireless device determines whether a shooting key is selected according to the user's key manipulation in step 407.

When the shooting key is selected in step 407, the wireless device determines whether an object image (excluding a background) and the height of the focus zone coincide with each other in the preview image in step 409.

When the object image (excluding the background) and the height of the focus zone coincide with each other in the preview image in step 409, the wireless device captures the object in step 411.

The wireless device displays the captured image (that is, object image) obtained via the capturing and displays an input window for receiving a device type and a name on the display unit in step 413.

The wireless device determines whether the device type and the name of a counterpart device are input via the input window in step 415.

When the device type and the name of the counterpart device are input via the input window in step 415, the wireless device obtains height information of the counterpart device based on the input device type and determines a shooting distance D using the obtained height information in step 417. Here, the shooting distance D may be determined using Equation 1.

The wireless device determines an RDV based on the determined shooting distance D in step 419. Here, the RDV is determined using Equation 2.

The wireless device determines whether the same RDV as the determined RDV exists in a database in step 421.

When the same RDV as the determined RDV does not exist in the database in step 421, the wireless device maps the determined RDV to a captured image of the counterpart device as counterpart device information regarding the specific function, and displays the mapping result on the display unit in step 423.

The wireless device determines whether a registration key for the displayed counterpart device information regarding the specific function is input in step 425.

When the registration key is input in step 425, the wireless device registers the counterpart device information for the specific function in step 427.

In contrast, when the same RDV as the determined RDV exists in the database in step 421, the wireless device collects auxiliary information in step 431, and maps the determined RDV and the collected auxiliary information to the captured image of the counterpart device as the counterpart device information regarding the specific function, and displays the mapping results on the display unit in step 433, and proceeds to step 425 to perform subsequent steps.

In contrast, when the shooting key is not selected in step 407, the wireless device returns to step 405 to repeatedly perform subsequent steps.

In contrast, when the object image (excluding the background) and the height of the focus zone do not coincide with each other in the preview image in step 409, the wireless device informs that the object image and the height of the focus zone do not coincide with each other using an audio or visual notification, such as voice output via the speaker or using message output via the display unit in step 429, and then returns to step 405 to repeatedly perform subsequent steps. At this point, a user may allow the object image and the height of the focus zone to coincide with each other using a position movement, or an auto-focus function or a zoom function of the camera.

Figure 5:
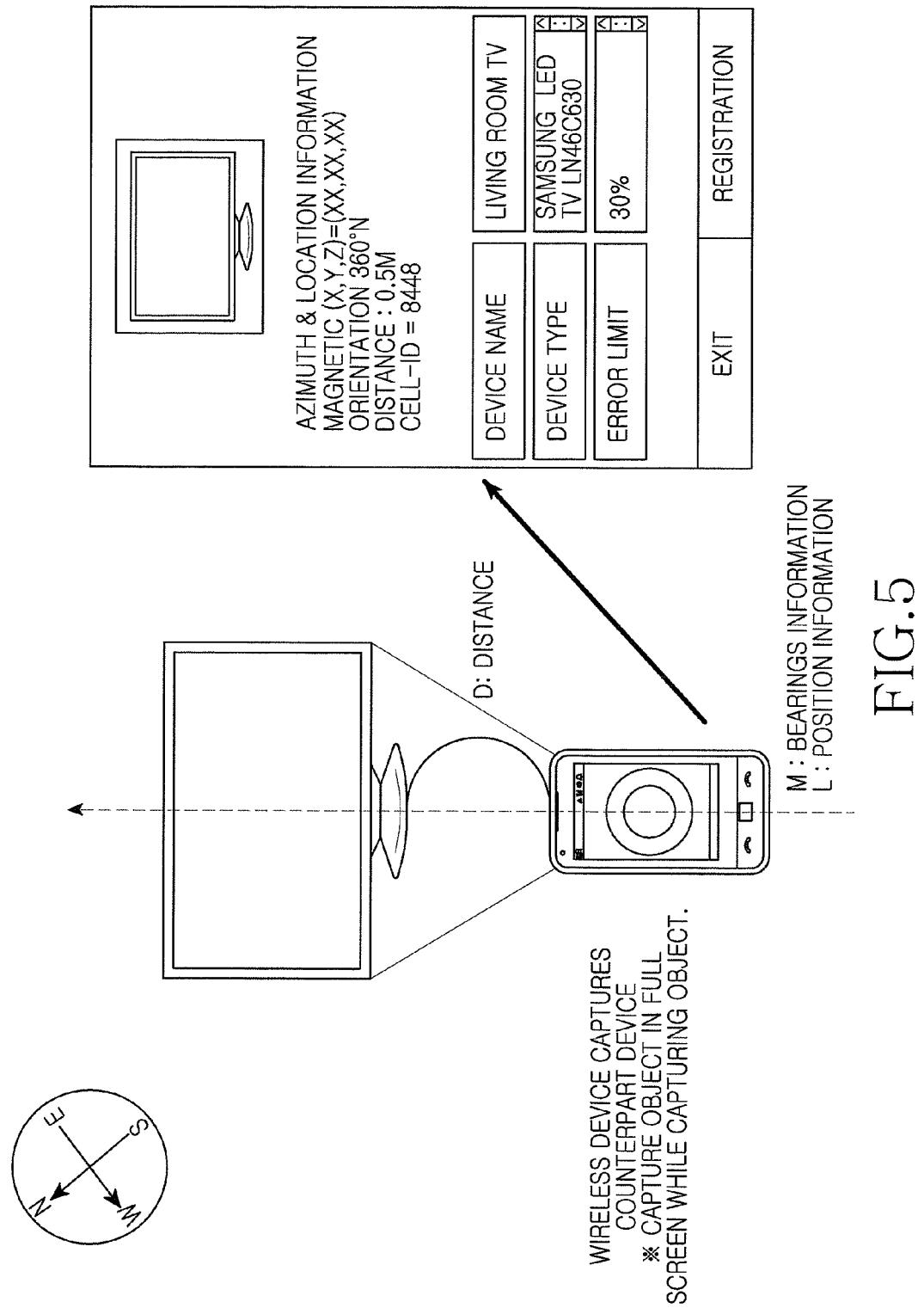
FIG. 5 is a view of a sample process for receiving a device type and a name of a counterpart device in a wireless device according to an embodiment of the present invention.

FIG. 5 is a view of a sample process for receiving a device type and a name of a counterpart device in a wireless device according to an embodiment of the present invention.

Referring to FIG. 5, the wireless device captures an image of the counterpart device whose connection is desired, displays the captured image (that is, object image) on a display unit, and displays a window for receiving a device type and a name. Here, the receiving of the device type of the counterpart device is for obtaining height information of the counterpart device for determining a shooting distance. The wireless device may receive the device type of the relevant counterpart device by displaying a list of model names of actually connectable counterpart devices and allowing a user to select one of the displayed model names. The wireless device may make, manage, and hold a database of basic information (for example, the height of a counterpart device) depending on the device type of the actually connectable counterpart device, may automatically search for and obtain a database of a counterpart device not held by the wireless device via a separate web server, and may update the database as the latest information through periodic searching. The receiving of the name of the counterpart device is for mapping a device connected and discovered in a network environment via device discovery to a user friendly name (for example, "living room TV" or "main room TV").

Figure 6A:
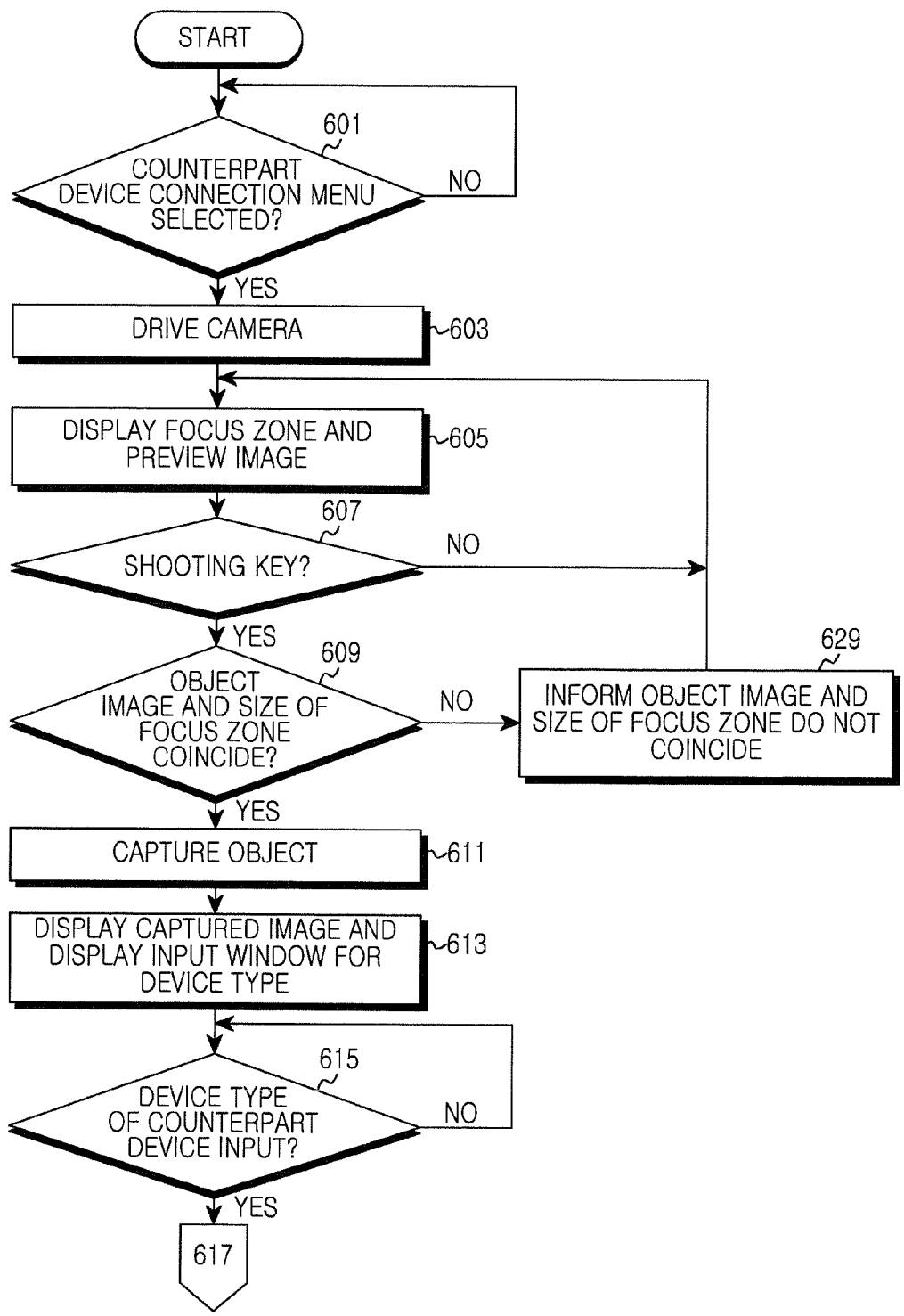
FIGS. 6A and 6B illustrate a process for connecting a counterpart device registered with respect to a specific function in the same network in a wireless device according to an embodiment of the present invention.
Figure 6B:
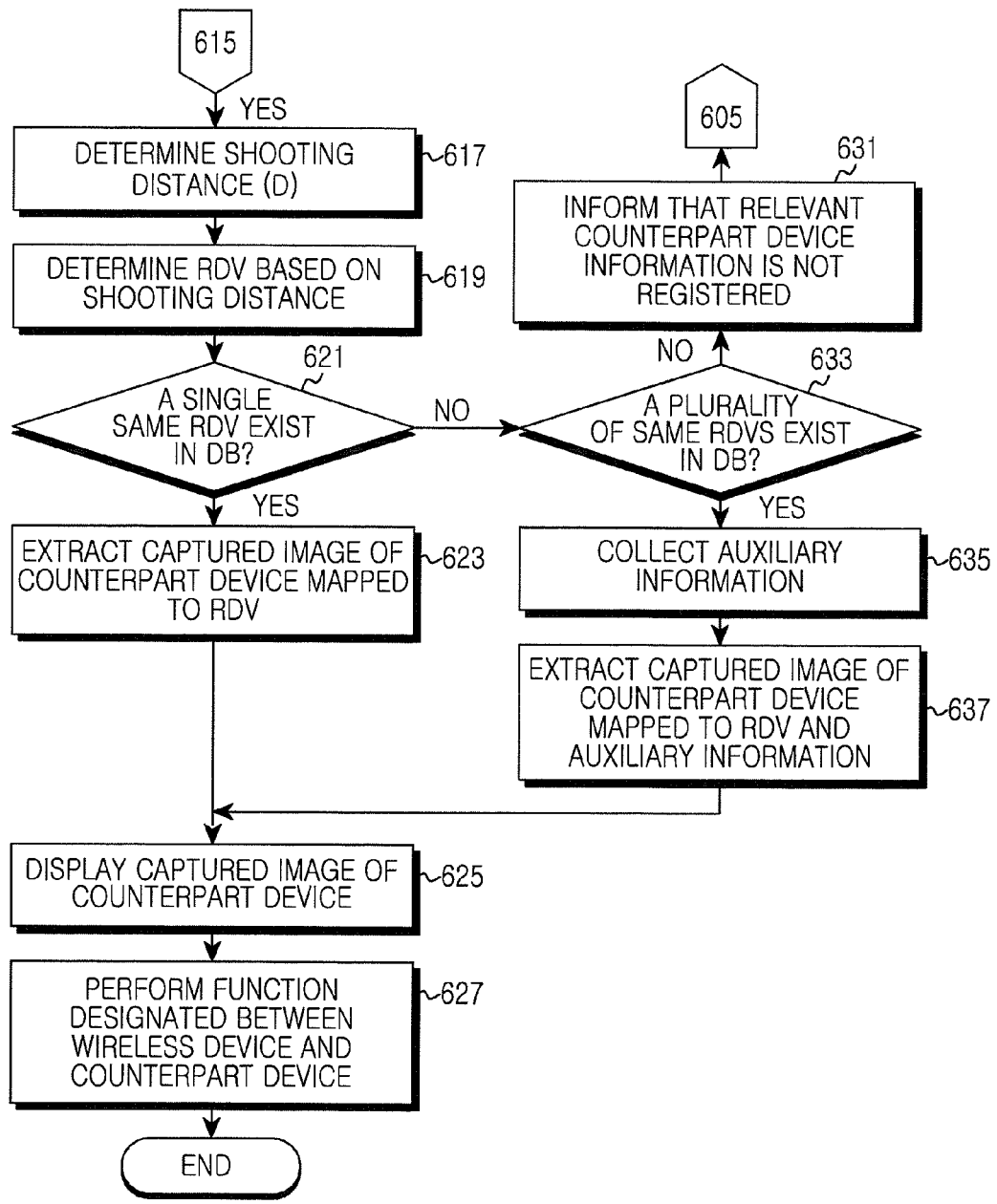

FIGS. 6A and 6B illustrate a process for connecting a counterpart device registered with respect to a specific function in the same network in a wireless device according to an embodiment of the present invention.

Referring to FIGS. 6A and 6B, the wireless device determines whether a counterpart device connection menu for performing a designated function between the wireless device and the counterpart device is selected according to a user's key manipulation in step 601. For example, the function may be one of an image view function, a multimedia play function, a data backup function, a data share function, a synchronization function, a slide show function, and so forth. Various functions may be provided beside these.

When the counterpart device connection menu for performing the designated specific function between the wireless device and the counterpart device is selected in step 601, the wireless device drives a camera in step 603, and displays a focus zone and a preview image corresponding to camera capturing on a display unit in step 605.

The wireless device determines whether a shooting key is selected in step 607.

When the shooting key is selected in step 607, the wireless device determines whether an object image (excluding a background) and the height of a focus zone coincide with each other in the preview image in step 609.

When the object image (excluding the background) and the height of the focus zone coincide with each other in the preview image in step 609, the wireless device captures the object in step 611.

The wireless device displays the captured image (that is, object image) obtained by the capturing on the display unit and displays an input window for receiving a device type in step 613.

The wireless device determines whether the device type of the counterpart device is input via the input window in step 615.

When the device type of the counterpart device is input via the input window in step 615, the wireless device obtains height information of the counterpart device based on the input device type, and determines a shooting distance D using the obtained height information in step 617. Here, the shooting distance D is determined using Equation 1.

The wireless device determines an RDV based on the determined shooting distance D in step 619. Here, the RDV is determined using Equation 2.

The wireless device determines whether one RDV that is the same as the determined RDV within a predetermined error range exists in a database in step 621.

When one RDV that is the same as the determined RDV within the predetermined error range exists in the database in step 621, the wireless device extracts the captured image of the counterpart device mapped to the RDV from the database in step 623.

The wireless device displays the captured image of the extracted counterpart device on the display unit in step 625, and performs a designated function between the wireless device and the relevant counterpart device in step 627.

In contrast, when one RDV that is the same as the determined RDV within the predetermined error range does not exist in the database in step 621, the wireless device determines whether a plurality of RDVs that are the same as the determined RDV within a predetermined error range exist in the database in step 633.

When the plurality of RDVs that are the same as the determined RDV within the predetermined error range exist in the database in step 633, the wireless device collects auxiliary information in step 635, extracts a captured image of the counterpart device mapped to the RDV and the collected auxiliary information in step 637, and then proceeds to step 625 to perform subsequent steps.

In contrast, when the plurality of RDVs that are the same as the determined RDV within the predetermined error range do not exist in the database in step 633, the wireless device informs that relevant counterpart device information is not registered using voice output via a speaker or using message output via the display unit in step 631, and returns to step 605 to repeatedly perform subsequent steps.

In contrast, when the shooting key is not selected in step 607, the wireless device returns to step 605 to repeatedly perform subsequent steps.

In contrast, when the object image excluding the background and the height of the focus zone do not coincide with each other in the preview image in step 609, the wireless device informs that the object image and the height of the focus zone do not coincide with each other using an audio or visual indicator, such as voice output via a speaker or using message output via the display unit, requests a user to match the object image and height of the focus zone in step 629, and then returns to step 605 to repeatedly perform subsequent steps. At this point, the user may match the object image with the height of the focus zone using a position movement, or an auto-focus function or a zoom function of a camera.

Figure 7:
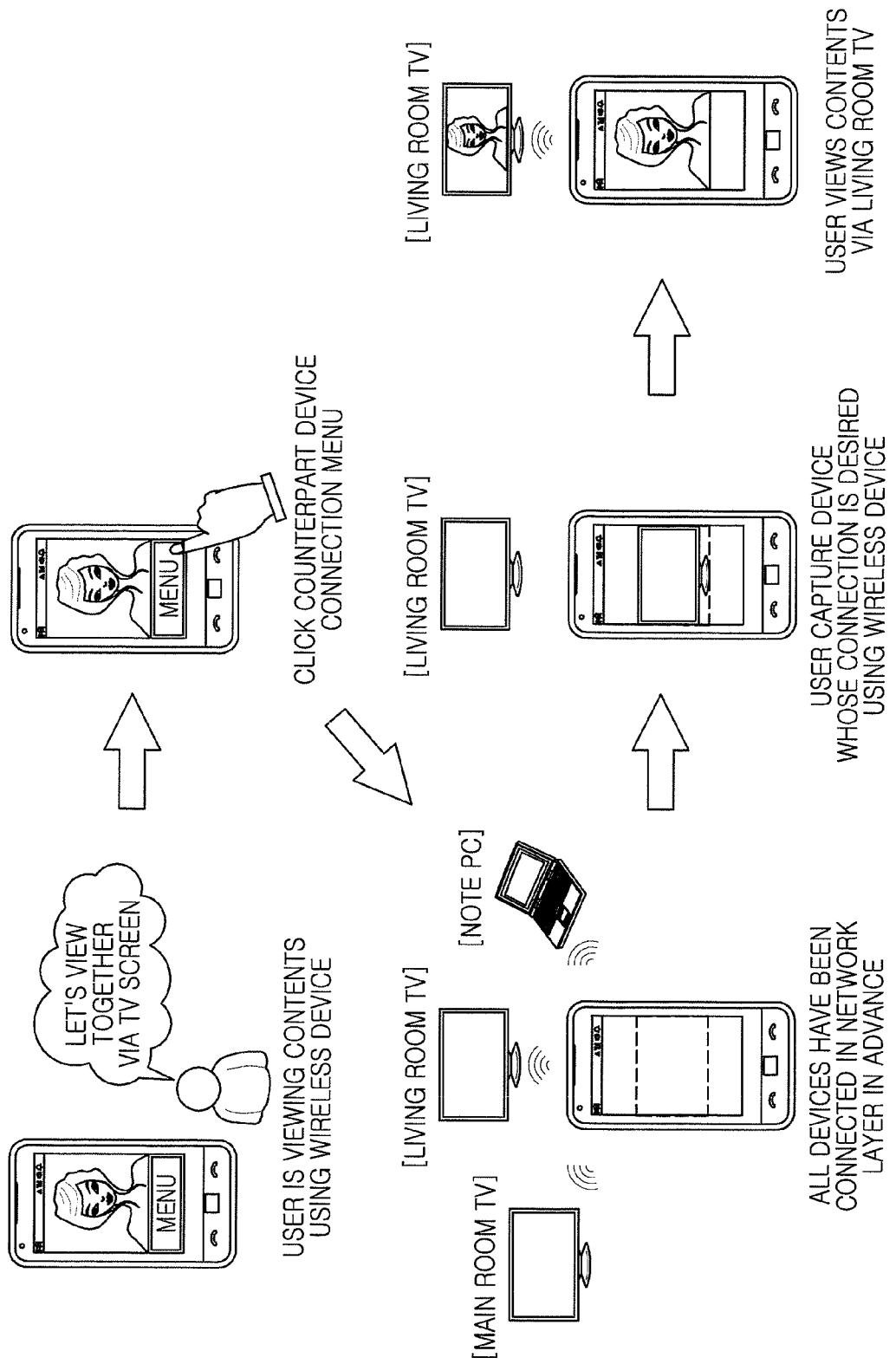
FIG. 7 is a view of a sample process for connecting a counterpart device registered with respect to a specific function in the same network in a wireless device according to an embodiment of the present invention.

FIG. 7 is a view of a sample process for connecting a counterpart device registered with respect to a specific function in the same network in a wireless device according to an embodiment of the present invention.

Referring to FIG. 7, when desiring to continue to view relevant contents via a living room TV while viewing the contents via a wireless device, a user may click a counterpart device connection menu of the wireless device. At this point, it may be assumed that connection of all devices inside the same network has been completed in a network layer. As the click of the counterpart device connection menu is detected while the wireless device executes the contents, the wireless device drives a camera module to allow the user to capture a counterpart device whose connection is desired. At this point, the user may capture the living room TV using the wireless device, and the wireless device may identify the living room TV through the capturing, and perform a function defined in advance between the wireless device and the living room TV, for example, transmit data to the living room TV to allow the user to continue to view the relevant contents via the living room TV.

Though a process for determining an RDV between a wireless device and a counterpart device using the same method as the method of registering the counterpart device to allow the wireless device to connect the counterpart device registered for a specific function in the same network, and identifying the counterpart device using the RDV has been described in embodiments of the present invention, a process for capturing an image of a counterpart device, comparing the captured image with an image registered in a database, and when the same image within a predetermined error range is registered in the database, performing a function designated in advance between the wireless device and the relevant counterpart device may be provided.

In addition, images captured at various directions and positions may be mapped to an RDV determined for one counterpart device, and stored and utilized.

Embodiments of the present invention provide an advantage of performing a function determined in advance (for example, an image view function, a multimedia play function, a data backup function, a data share function, a synchronization function, a slide show function, and such) between a wireless device and a counterpart device by capturing an image of the counterpart device via a camera of the wireless device to detect the counterpart device whose connection is desired and intuitively connecting the counterpart device. For example, while viewing an image via an image viewer in a wireless device, a user captures a printer using a camera module inside the wireless device, such that the wireless device is network-connected with the printer to automatically output an image. Such a function may add convenience to the user and simplify a series of procedures that must be completed for performing a predetermined function of a device frequently connected.

In addition, according to embodiments of the present invention, a wireless device determines a shooting distance between an object and the wireless device that performs a capturing operation while an image of the object is focused and resulted on a focus zone when capturing the image of the counterpart device (object) whose connection is desired using an image sensor inside a camera module mounted in the wireless device without a separate distance measuring device, and determines an RDV based on the determined shooting distance value to use the RDV as a unique identification factor of the counterpart device whose connection is desired. Accordingly, an additional device or cost may not be required, and a counterpart device captured at a specific position and separated by a specific distance may be easily connected.

Although the invention has been shown and described with reference to certain embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a wireless device in a network environment where the wireless device and a counterpart device exist, the method comprising:

registering the counterpart device to be connected for performing at least one function, by mapping a pre-determined Relative Distance Value (RDV) to a captured image of the counterpart device;

while capturing the image of the counterpart device, determining an RDV between the wireless device and the counterpart device by matching a height of the counterpart device in a preview image to a focus zone on a display of the wireless device;

identifying the counterpart device corresponding to the determined RDV; and performing a function determined in advance between the wireless device and the counterpart device using the identified counterpart device.

2. The method of claim 1, wherein the function determined in advance between the wireless device and the counterpart device comprises at least one of an image view function, a multimedia play function, a data backup function, a data share function, a synchronization function, and a slide show function.

3. The method of claim 1, wherein determining the RDV comprises:

displaying a focus zone and a preview image corresponding to the captured image associated with the counterpart device on a display unit;

after a shooting key is selected, determining whether an object image and a height of the focus zone coincide in the preview image;

when the object image and the height of the focus zone coincide in the preview image, capturing the counterpart device; and when the object image and the height of the focus zone do not coincide in the preview image, indicating that the object image and the height of the focus zone do not coincide and requesting to match the object image and the height of the focus zone.

4. The method of claim 3, wherein the object image and the height of the focus zone are matched using at least one of a user's position movement, an auto-focus function of a camera, and a zoom function of the camera.

5. The method of claim 4, wherein determining the RDV further comprises:

displaying an input window for receiving a device type of the counterpart device on a display unit; and after the device type of the counterpart device is input via the input window, determining a height of the object based on the input device type and determining a shooting distance based on the height of the object, a focal length of the camera, and a height of an image sensor of the camera, wherein the shooting distance D is determined using Equation below:

$$\text{Shooting distance } D = \frac{\text{Height}(H) \text{ of object}}{\text{Height}(h) \text{ of image sensor}} \times \text{Focal length } (d)^*.$$

6. The method of claim 5, wherein the RDV is determined based on the determined shooting distance using the Equations below:

$$RDV = \frac{\text{shooting distance } D}{\text{image proportional } const. \ \varepsilon \times \text{focal length proportional } cont. \ \eta}$$

$$\text{image proportional } const. \ \varepsilon = \frac{\text{object image size } I_{zone}}{\text{focus zone size } F_{zone}}$$

$$\text{focal length proportional } const. \ \eta = \frac{\text{shooting focal distance } d_s}{\text{basic focal distance } d_b}$$

wherein the object image size $I_{zone}$ is the size of the object image, the focus zone size $F_{zone}$ is a reference value of a vertical size of the object image, the basic focal distance $d_b$ is a focal distance when there is no zoom-in or zoom-out, and the shooting focal distance $d_s$ is a focal distance used for actual shooting.

7. The method of claim 1, wherein identifying the counterpart device comprises:

determining whether an RDV that is within a predetermined error range of the determined RDV exists in a database; and when the RDV that is within the predetermined error range of the determined RDV exists in the database, extracting a stored image of the counterpart device mapped to the RDV that is within the predetermined error range of the determined RDV from the database.

8. The method of claim 7, wherein extracting a stored image of the counterpart device comprises:

when a plurality of RDVs that are within the predetermined error range of the determined RDV exist in the database, collecting auxiliary information for identifying the counterpart device; and extracting the stored image of the counterpart device mapped to the RDV that is within the predetermined error range of the determined RDV and the collected auxiliary information from the database, wherein the auxiliary information comprises at least one of position information and bearings information.

9. The method of claim 7, further comprising, when the RDV that is within the predetermined error range of the determined RDV does not exist in the database, indicating that relevant counterpart device information is not registered.

10. The method of claim 1, wherein the pre-determined RDV is determined based on an RDV between the wireless device and the counterpart device via image capture.

11. The method of claim 10, further comprising:

determining whether a plurality of RDVs that are within the predetermined error range of the determined RDV exist in a database;

when a plurality of RDVs that are within the predetermined error range of the determined RDV exist in the database, collecting auxiliary information for identifying the counterpart device; and mapping the determined RDV and the collected auxiliary information to the captured image of the counterpart device and storing the same, wherein the auxiliary information comprises at least one of position information and bearings information.

12. An apparatus of a wireless device in a network environment where the wireless device and a counterpart device exist, the apparatus comprising:

a camera unit configured to capture an image of the counterpart device; and a counterpart device registration and connection manager configured to register the counterpart device to be connected for performing at least one function, by mapping a pre-determined Relative Distance Value (RDV) to a captured image, while capturing an image of the counterpart device, determining an RDV between the wireless device and the counterpart device by matching a height of the counterpart device in a preview image to a focus zone on a display of the wireless device;

identifying the counterpart device corresponding to the determined RDV, and performing a function determined in advance between the wireless device and the counterpart device using the identified counterpart device.

13. The apparatus of claim 12, wherein the function determined in advance between the wireless device and the counterpart device comprises at least one of an image view function, a multimedia play function, a data backup function, a data share function, a synchronization function, and a slide show function.

14. The apparatus of claim 12, further comprising a display unit configured to display a focus zone and a preview image after capturing the image of the counterpart device, wherein the counterpart device registration and connection manager is further configured to determine whether an object image associated with the counterpart device and a height of focus zone coincide in the preview image after a shooting key is selected, control the camera unit to capture the object when the object image and the height of the focus zone coincide in the preview image, and when the object image and the height of the focus zone do not coincide in the preview image, indicate that the object image and the height of the focus zone do not coincide with each other and request to match the object image and the height of the focus zone.

15. The apparatus of claim 14, wherein the counterpart device registration and connection manager is further configured to match the object image and the height of the focus zone using at least one of a user's position movement, an auto-focus function of a camera, and a zoom function of the camera.

16. The apparatus of claim 15, wherein the display unit is further configured to display an input window configured to receive a device type of the counterpart device,
wherein the counterpart device registration and connection manager is further configured to, after the device type of the counterpart device is input via the input window, determine a height of the object based on the input device type, and determine a shooting distance based on the height of the object, a focal length of the camera, and a height of an image sensor of the camera, and
wherein the shooting distance is determined using Equation below:

$$\text{Shooting distance } D = \frac{\text{Height}(H) \text{ of object}}{\text{Height}(h) \text{ of image sensor}} \times \text{Focal length } (d).$$

17. The apparatus of claim 16, wherein the RDV is determined based on the determined shooting distance using the Equations below:

$$RDV = \frac{\text{shooting distance } D}{\text{image proportional } const. \ \varepsilon \times \text{focal length proportional } cont. \ \eta}$$

$$\text{image proportional } const. \ \varepsilon = \frac{\text{object image size } I_{zone}}{\text{focus zone size } F_{zone}}$$

$$\text{focal length proportional } const. \ \eta = \frac{\text{shooting focal distance } d_s}{\text{basic focal distance } d_b}$$

wherein the object image size $I_{zone}$ is the size of the object image, the focus zone size $F_{zone}$ is a reference value of a vertical size of the object image, the basic focal distance $d_b$ is a focal distance when there is no zoom-in or zoom-out, and the shooting focal distance $d_s$ is a focal distance used for actual shooting.

18. The apparatus of claim 12, wherein the counterpart device registration and connection manager is further configured to determine whether an RDV that is within a predetermined error range of the determined RDV exists in a database, and when the RDV that is within a predetermined error range of the determined RDV exists in the database, extract a stored image of the counterpart device mapped to the RDV from the database.

19. The apparatus of claim 18, wherein the counterpart device registration and connection manager is further configured to, when a plurality of RDVs that are within the predetermined error range of the determined RDV exist in the database, collect auxiliary information for identifying the counterpart device, and extract the stored image of the counterpart device mapped to the RDV that is within the predetermined error range of the determined RDV and the collected auxiliary information from the database,
wherein the auxiliary information comprises at least one of position information and bearings information.

20. The apparatus of claim 18, wherein the counterpart device registration and connection manager is further configured to, when the RDV that is within the predetermined error range of the determined RDV does not exist in the database, indicate that relevant counterpart device information is not registered.

21. The apparatus of claim 12, wherein the pre-determined RDV is determined based on an RDV between the wireless device and the counterpart device via image capture.

22. The apparatus of claim 21, wherein the counterpart device registration and connection manager is further configured to determine whether a plurality of RDVs that are within the predetermined error range of the determined RDV exist in a database, collect auxiliary information for identifying the counterpart device when a plurality of RDVs that are within the predetermined error range of the determined RDV exist in the database, and map and store the determined RDV and the collected auxiliary information to the captured image of the counterpart device,
wherein the auxiliary information comprises at least one of position information and bearings information.

* * * * *